(12) United States Patent
Yu et al.

(10) Patent No.: US 10,421,314 B2
(45) Date of Patent: Sep. 24, 2019

(54) HERRINGBONE SURFACE DECORATIVE MATERIAL AND MANUFACTURING METHOD THEREOF

(71) Applicant: Shanghai Jinka Flooring Technology Co., Ltd., Shanghai (CN)

(72) Inventors: Hsiung-Tieh Yu, Shanghai (CN); Stephen Chang, Shanghai (CN)

(73) Assignee: SHANGHAI JINKA FLOORING TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 15/402,075

(22) Filed: Jan. 9, 2017

(65) Prior Publication Data

US 2018/0029407 A1    Feb. 1, 2018

(30) Foreign Application Priority Data

Jul. 29, 2016   (CN) .......................... 2016 1 0613625

(51) Int. Cl.
| | |
|---|---|
| *B44C 5/04* | (2006.01) |
| *B44F 9/02* | (2006.01) |
| *E04F 13/08* | (2006.01) |
| *E04F 15/02* | (2006.01) |
| *E04F 15/10* | (2006.01) |
| *B32B 21/00* | (2006.01) |
| *B32B 37/10* | (2006.01) |
| *B32B 38/06* | (2006.01) |
| *B44C 1/24* | (2006.01) |
| *E04F 13/10* | (2006.01) |
| *E04F 15/022* | (2006.01) |
| *E04F 15/04* | (2006.01) |

(52) U.S. Cl.
CPC ............ *B44C 5/0476* (2013.01); *B32B 21/00* (2013.01); *B32B 37/10* (2013.01); *B32B 38/06* (2013.01); *B44C 1/24* (2013.01); *B44C 5/04* (2013.01); *B44F 9/02* (2013.01); *E04F 13/0866* (2013.01); *E04F 13/0894* (2013.01); *E04F 13/10* (2013.01); *E04F 15/02* (2013.01); *E04F 15/022* (2013.01); *E04F 15/02038* (2013.01); *E04F 15/04* (2013.01); *E04F 15/048* (2013.01); *E04F 15/107* (2013.01); *B32B 2419/04* (2013.01)

(58) Field of Classification Search
CPC .................................................... B44C 5/0476
USPC ........................................................... 428/44
See application file for complete search history.

(56) References Cited

U.S. PATENT DOCUMENTS

| | | | | |
|---|---|---|---|---|
| 5,117,603 A | * | 6/1992 | Weintraub | .............. E04F 15/04 |
| | | | | 52/390 |
| 2015/0197943 A1 | * | 7/2015 | Ziegler | ................... B32B 37/10 |
| | | | | 428/161 |

FOREIGN PATENT DOCUMENTS

| | | |
|---|---|---|
| CN | 100375823 C | 9/2008 |
| CN | 203174975 U | 9/2013 |

* cited by examiner

Primary Examiner — Brent T O'Hern
(74) Attorney, Agent, or Firm — Cheng-Ju Chiang

(57) ABSTRACT

A herringbone surface decorative material includes two different types of rectangular shaped surface decorative sections, i.e. type-B1 and type-B2 decorative sections. Each of the decorative sections includes a plurality of parallel oblique pattern stripes and boundary lines are formed between adjacent pattern stripes. The boundary lines of the type-B1 and the type-B2 decorative sections are mirrored each other. The present invention further provides a method for manufacturing the same.

13 Claims, 9 Drawing Sheets

B1  B2

B1    B2

HERRINGBONE SURFACE DECORATIVE MATERIAL AND MANUFACTURING METHOD THEREOF

CROSS REFERENCE TO RELATED APPLICATION

The present application is based on and claims priority of Chinese Patent Application No. 201610613625.4, filed on Jul. 29, 2016. The entire disclosure of the above-identified application, including the specification, drawings and claims are incorporated herein by reference in its entirety.

Field of the Invention

The present invention relates to a decorative building material, and more particularly to a herringbone surface decorative material and manufacturing method thereof.

Background of the Invention

Accompanying with improvements of people's living standards, parquet floorings are chose by more and more people. Herringbone pattern is a common type of parquet flooring pattern, with simple joining manner and good mosaic effect.

Chinese patent number CN100375823C discloses one type of herringbone flooring, which includes two different types of floorboards, i.e., floorboard A and floorboard B. The two types of floorboards are configured in rectangular shape, and are interlocked together mechanically. During installation, the floorboards are placed to form an angle of 45 degree with a length direction of a room and the floorboards at corners of the room need to be cut into pieces with suitable size. The pieces are the so-called fitting pieces in CN100375823C.

Chinese patent number CN203174975U discloses another type of herringbone flooring, which also includes two different types of floorboards being mechanically interlocked together. During installation, the floorboards are placed in a direction parallel or perpendicular to a length direction of a room and the two types of the floorboards are interlocked in a manner the two types of the floorboards perpendicular to each other.

In the abovementioned two types of herringbone floorings, the floorboards are both interconnected by tongue-and-groove structures. During installation, the adjoining floorboards need to be interlocked in first edge to first edge, or first edge to second edge, or second edge to second edge manner, which results to a low installation efficiency, and requires high dimensional stability and high grooving precision of the floorboards, and further makes the floorboards be expensive.

Otherwise, as shown in FIG. 1, the herringbone flooring can also be consisted by parallelogram floorboards. In this kind of flooring, an apex angle of the herringbone is not limited to 90 degree and may have many more options. During installation, small gaps are inevitably formed between adjoining floorboards, which makes apexes of the herringbone can not be aligned in a straight line and more particularly, position deviations of the apexes may become greater if the laying area of the floorboards is greater. In order to make the apexes of the herringbone align in a straight line, floorboards with different dimensions are needed to compensate the position deviations. For example, floorboards with small dimensions are needed at the positions the apexes of the herringbone deviate to right, to make the apexes of the herringbone move to left. This makes the floorboards could not have identical dimensions, and increases manufacturing and laying complexity of the floorboards. Therefore, this kind of the herringbone flooring is not suitable for industry applications.

Furthermore, parquet flooring usually requires the floorboards having high quality, which makes the floorboards be usually made of materials with good dimensional stability, and materials with good dimensional stability are usually expensive. Furthermore, during installation, expansion joints are needed to be reserved between the floorboards and the wall in order to provide adequate expansion spaces for the floorboards. However, due to the floorboards usually have different expansion directions, the expansion joints are not suitable for being reserved between the floorboards and the wall, and are usually reserved between adjoining floorboards, as well as the floorboards are needed to be interlocked together, the width of the expansion joints could not be large. Therefore, the herringbone flooring could not reserve suitable expansion joints and could not provided adequate expansion spaces for the floorboards.

SUMMARY OF THE INVENTION

The object of the present invention is to provide a herringbone surface decorative material, which is easy to manufacture and installation.

The further objection of the present invention is to provide a manufacturing method of a herringbone surface decorative material.

The herringbone surface decorative material of present invention includes type-B1 and type-B2 decorative sections. The type-B1 decorative sections and the type-B2 decorative sections each is in rectangular shape and has two pairs of opposite edges, and further includes a plurality of parallel rows of oblique pattern stripes. A boundary line is formed between the adjacent pattern stripes. The boundary lines of adjacent pattern stripes of the type-B1 decorative sections and the type-B2 decorative sections are mirrored.

The method for manufacturing the herringbone surface decorative material includes: providing rectangular shaped transparent wear resistance layer; providing rectangular shaped base layer; providing rectangular shaped first decoration layer with a plurality of oblique pattern stripes; providing rectangular shaped second decoration layer with a plurality of oblique pattern stripes, the first or the second decoration layer includes one or more boundary lines between adjacent pattern stripes, the boundary lines between adjacent pattern stripes of the second decoration layer being arranged in a mirror-inverted manner relative to the boundary lines between adjacent pattern stripes of the first decoration layer; hot pressing the wear resistance layer, the first decoration layer or the second decoration layer and the base layer into a single piece, obtaining a semi-finished first product or a semi-finished second product; cutting the semi-finished first product and second product into small pieces, obtaining a type-B1 decorative section and a type-B2 decorative section, the type-B1 decorative section and the type-B2 board each has a plurality of oblique pattern stripes and one or more boundary lines between adjacent pattern stripes, the boundary lines between adjacent pattern stripes of the type-B2 decorative section are arranged in a mirror-inverted manner relative to the boundary lines between adjacent pattern stripes of the type-B1 decorative section.

The surface decorative sections of the present invention could be assembled by locking structures. When the surface decorative sections are assembled by locking structures, the type-B1 decorative sections and the type-B2 decorative sections only need one type of tongue-and-groove structures, which simplifies manufacturing of locking structures of the type-B1 decorative sections and the type-B2 decorative sections. Furthermore, the surface decorative sections of the present invention can be installed rapidly and more efficiency, and is more easily for the apexes of the herringbone patterns to be lain in a straight line, and adequate expansion joints could be reserved which decreases the dimensional stability requirement of the surface decorative sections.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

The herringbone surface decorative material of the present invention is a multilayer composite material, which can be used to cover ceiling, wall, and wardrobe as well as ground. Hereinafter, the surface cover material being flooring is taken as an example.

Figure 1:
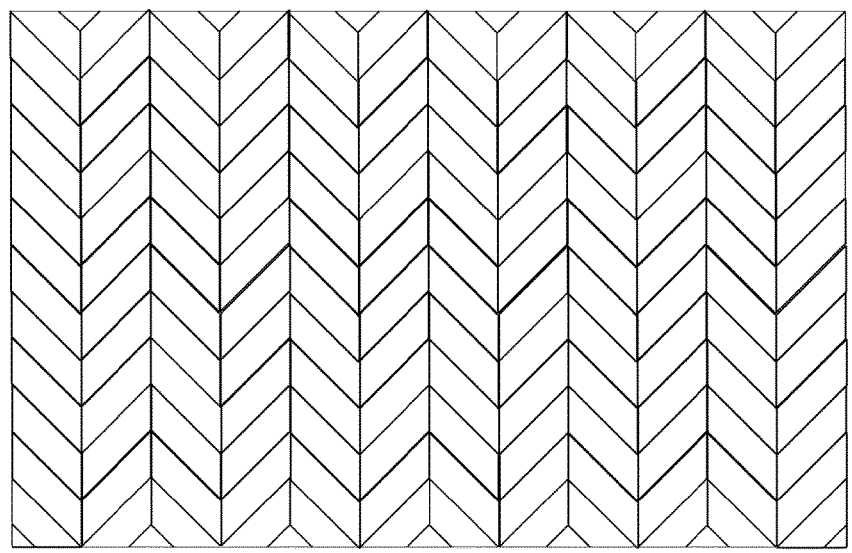
FIG. 1 is a schematic view showing a traditional herringbone flooring.
Figure 2:
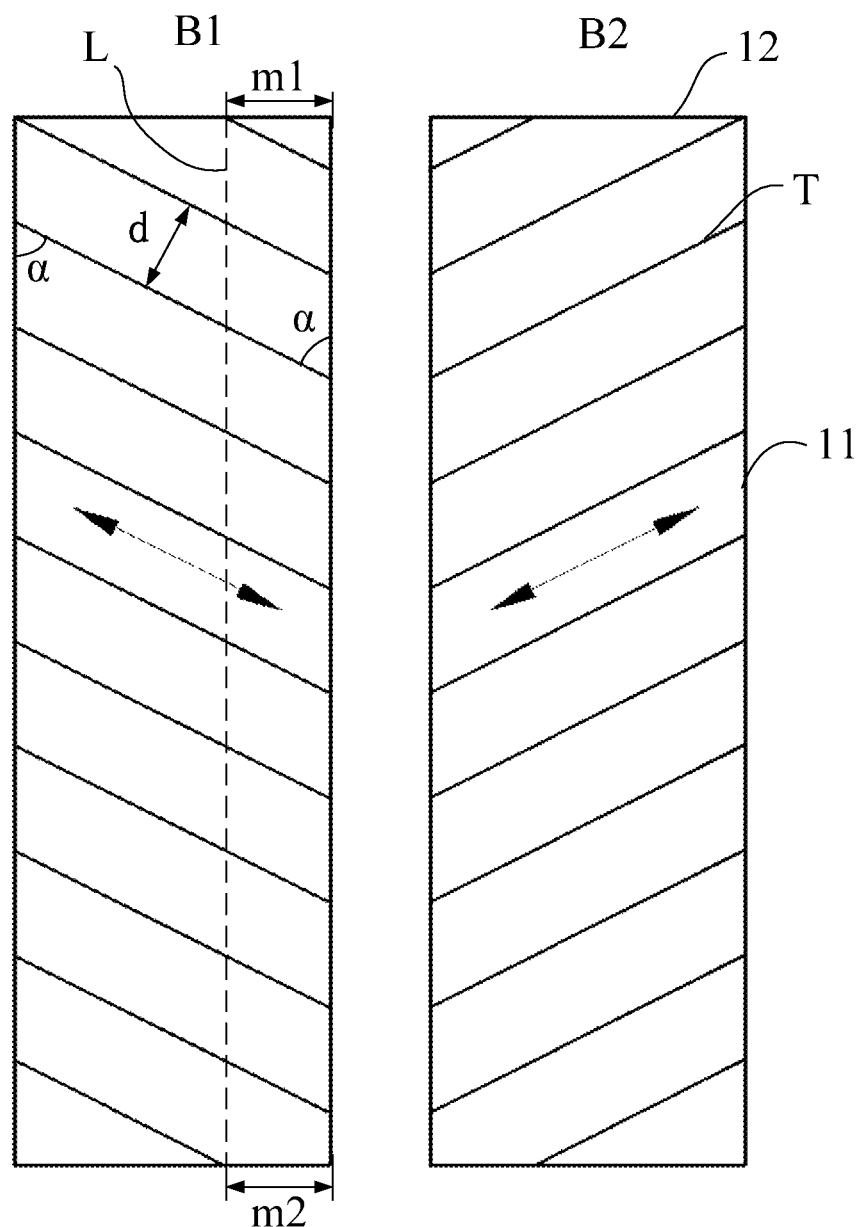
FIG. 2 is a schematic view showing surface covering sections of a herringbone surface covering material according to a first embodiment of the present invention.
Figure 3:
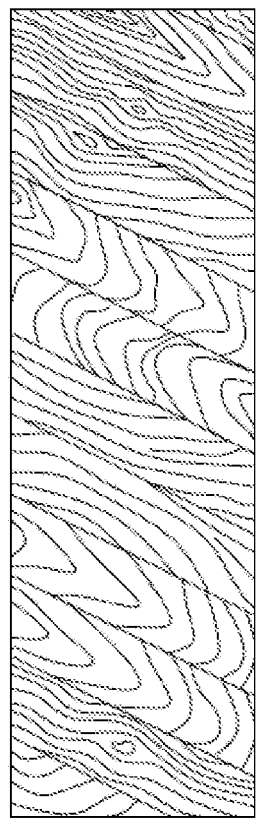
FIG. 3 is a schematic view showing surface covering sections of a herringbone surface covering material according to a second embodiment of the present invention.
Figure 3:
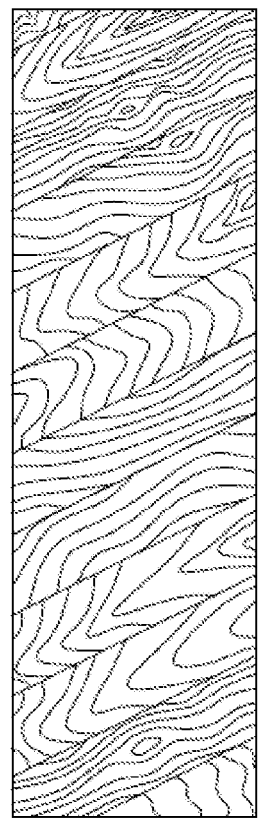
Figure 4:
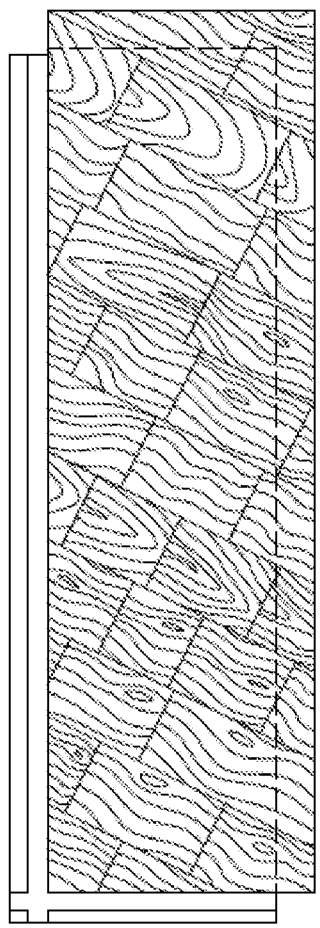
FIG. 4 is a schematic view showing surface covering sections of a herringbone surface covering material according to a third embodiment of the present invention.
Figure 4:
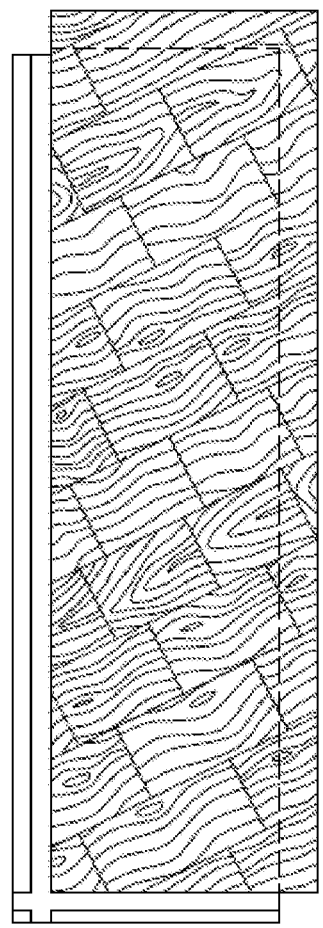

Referring to FIG. 2, the herringbone surface decorative material includes two different types of surface decorative sections, i.e., type-B1 decorative section and type-B2 decorative section. The two types of surface decorative sections are configured in rectangular shape. The type-B1 decorative section and the type-B2 decorative section each includes a pair of opposite first edges 11 and a pair of second opposite edges 12. In the present embodiment, the first edges 11 extend along the longitudinal direction of the surface decorative section, and the second edges 12 extend along the lateral direction of the surface decorative section. The length and the width of the type-B1 decorative section equals to the length and the width of the type-B2 decorative section respectively. The type-B1 decorative section and the type-B2 decorative section each includes a wear resistance layer (or sheet), a decoration layer (or sheet) and a base layer (or sheet) sequentially from top to bottom. The surfaces of the decoration layer of the type-B1 decorative section and the type-B2 decorative section both include a plurality of oblique pattern stripes. Referring to FIG. 3 and FIG. 4, the pattern stripes may be comprised by a whole piece of wood grain pattern or a number of wood grain bars. In the embodiment shown in FIG. 4, each pattern stripe includes only one row of wood grain bars. In other embodiment, the pattern stripe may include several parallel rows of wood grain bars. In the embodiment that the pattern stripe includes several parallel rows of wood grain bars, the bars of adjacent rows are mutually offset in the longitudinal direction of the pattern stripe, wherein the direction of the parallel rows is not parallel to any edges of the above-mentioned decorative sections. As shown in FIG. 3 and FIG.4, the pattern textures of the wood grain pattern or the wood grain bar are usually not the same or not identical. Referring back to FIG. 2, boundary lines T between the adjacent pattern stripes of the type-B1 decorative section parallel to each other and the pattern stripes of the type-B1 decorative section have the same width d. Boundary lines T between the adjacent pattern stripes of the type-B2 decorative section parallel to each other and the pattern stripes of the type-B2 decorative section have the same width d. Except for the pattern stripes at opposite left and right corners of the type-B1 and the type-B2 decorative sections, the rest pattern stripes of the type-B1 and the type-B2 decorative sections are all configured to parallelogram shape with an acute angle. The boundary lines T between adjacent pattern stripes of the type-B1 decorative section each forms an acute angle α with the first edges 11 of the type-B1 decorative section. The acute angle α is ranged from 0 degree to 90 degree but not equal to 0 degree and 90 degree. Preferably, the acute angle α is ranged from 30 degree to 60 degree, such as 30 degree, 45 degree or 60 degree. The boundary lines T between adjacent pattern stripes of the type-B2 decorative section are arranged in a mirror-inverted manner relative to the boundary lines T between the adjacent pattern stripes of the type-B1 decorative section.

It should be noted that, in this embodiment, the type-B1 decorative section and the type-B2 decorative section each has two non-parallelogram pattern stripes at its opposite left and right corners. A connection line L, which connects the intersection point of the left non-parallelogram pattern stripes and its adjoining second edge 12 with the intersection point of the right non-parallelogram pattern stripe and its adjoining second edge 12 of each surface decorative section, substantially parallels to the first edge 11 of the surface decorative section. That is, a total width of the two non-parallelogram pattern stripes along the second edge 12 of the surface decorative section equals to the width of the surface decorative section, or intersection points of the two non-parallelogram pattern stripes and their adjacent second edges 12 of the surface decorative section keep the same distances from one of the first edges 11 of the surface decorative section. That is, m1 equals to m2 in FIG. 2. Alternatively, in some other embodiments, for example, in the embodiments that the type-B1 decorative section and the type-B2 decorative section each has more than two non-parallelogram pattern stripes (such as three non-parallelogram pattern stripes) at its corners, intersection points of the non-parallelogram pattern stripes and its adjacent second edges 12 keep the same distances from the same first edge 11 of the surface decorative section.

It should be noted that, the type-B1 decorative section and type-B2 decorative section may be formed on two different boards, or may by formed on the same board. In the embodiment that the type-B1 and the type-B2 decorative sections are formed on the same board, the board may include one or more type-B1 decorative sections and one or more type-B2 decorative sections. Adjacent type-B1 or the type-B2 decorative sections corporately use a second edge 12, and adjacent type-B1 and type-B2 decorative sections corporately use a first edge 11.

It should be noted that, in this embodiment, the wear resistance layer, the decoration layer and the base layer of the type-B1 decorative section and the type-B2 decorative section are preferably PVC sheets. The surface of the wear resistance layer of the type-B1 decorative section and the type-B2 decorative section has a plurality of embossing stripes. The embossing stripes may be composed by wood grain texture or wood grain bars, and extension directions of the embossing stripes are the same as the length directions (arrow directions as shown in FIG. 2) of the pattern stripes of the decoration layer. Furthermore, different embossing stripes have different depths, that is, these embossing stripes have two or more depth values. Therefore, the surface of the surface decorative section is full of stereo feeling which makes the surface decorative sections looks beautiful after installation. In addition, in order to enhance wear resistance of the surface decorative section and make the surface of the surface decorative sections look glossier, a UV coating layer is formed on the surface of the wear resistance layer. Furthermore, in order to facilitate interlocking the surface decorative sections, the type-B1 decorative section and the type-B2 decorative section are equipped with the same locking structures.

Figure 5:
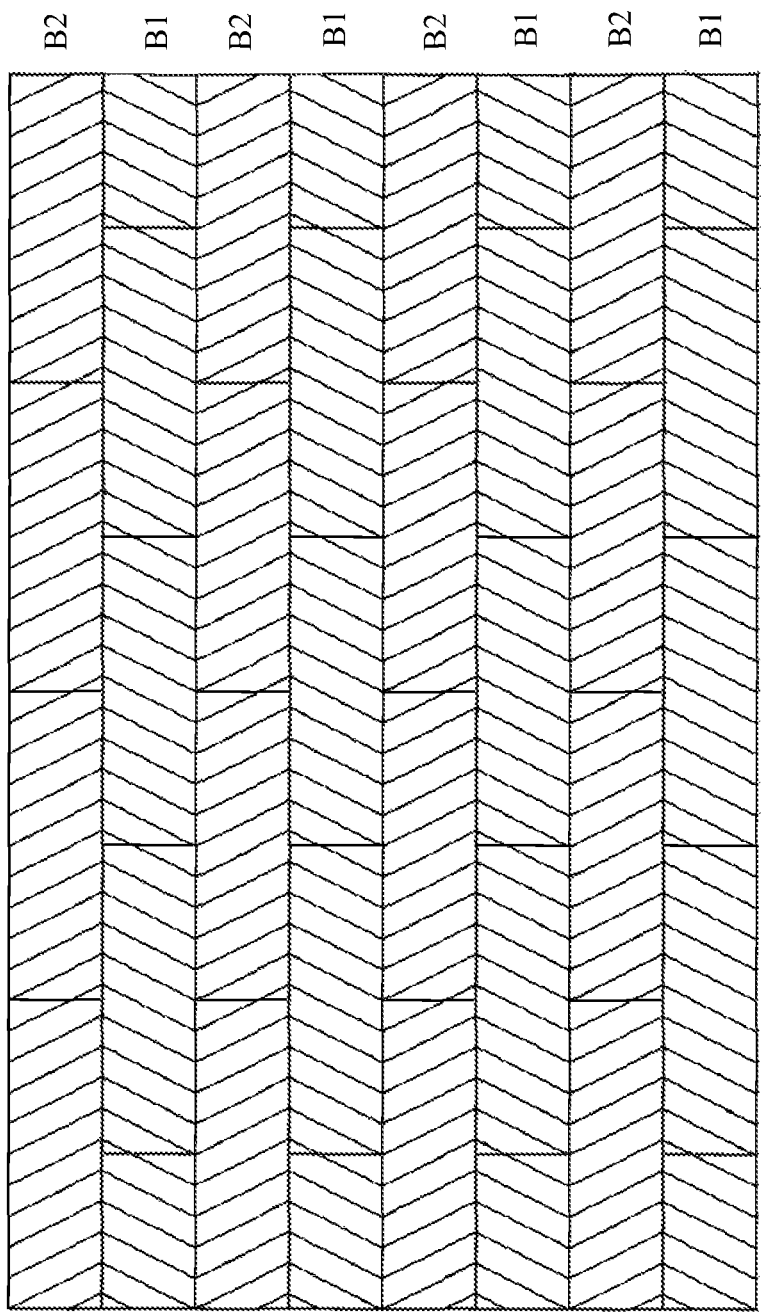
FIG. 5 is a schematic view showing a laying manner of the surface decorative sections of the surface decorative material of the present invention.

More concretely, referring to FIG. 5, when installing the surface decorative sections, rows of the type-B1 decorative sections and rows of the type-B2 decorative sections could be arranged in an alternate manner, that is, if the first row is lain by the type-B1 decorative sections, the second row needs to be lain by the type-B2 decorative sections, the third row needs to be lain by the type-B1 decorative sections, and the fourth row needs to be lain by the type-B2 decorative sections, then the fifth row needs to be lain by . . . , and so on until the ground is fully paved. In order to increase the connection strength of adjacent rows of the decorative sections, the decorative sections of adjacent rows needs to be placed mutually offset along the longitudinal direction.

In this embodiment, due to the boundary lines between adjacent pattern stripes of the type-B2 decorative section are arranged in mirror-inverted manner relative to the boundary lines between adjacent pattern stripes of the type-B1 decorative section, therefore, after the installation of the surface decorative sections, the pattern stripes of the type-B2 decorative section could just join with the corresponding pattern stripes of the type-B1 decorative section and form a plurality of herringbone patterns, with apexes of the herringbone patterns locating in a straight line. Due to the intersection points of the corner non-parallelogram pattern stripes and their adjacent second edges 12 keep the same distances from the same first edge 11 of the type-B1 or the type-B2 decorative section, therefore, after installation of the surface decorative sections, the pattern stripes of adjacent type-B1 decorative sections or adjacent type-B2 decorative sections could just join with each other and the boundary lines of could be continuous. Therefore, the pattern stripes of the surface decorative sections appear as smooth herringbone patterns and look beautiful after installation.

Figure 6:
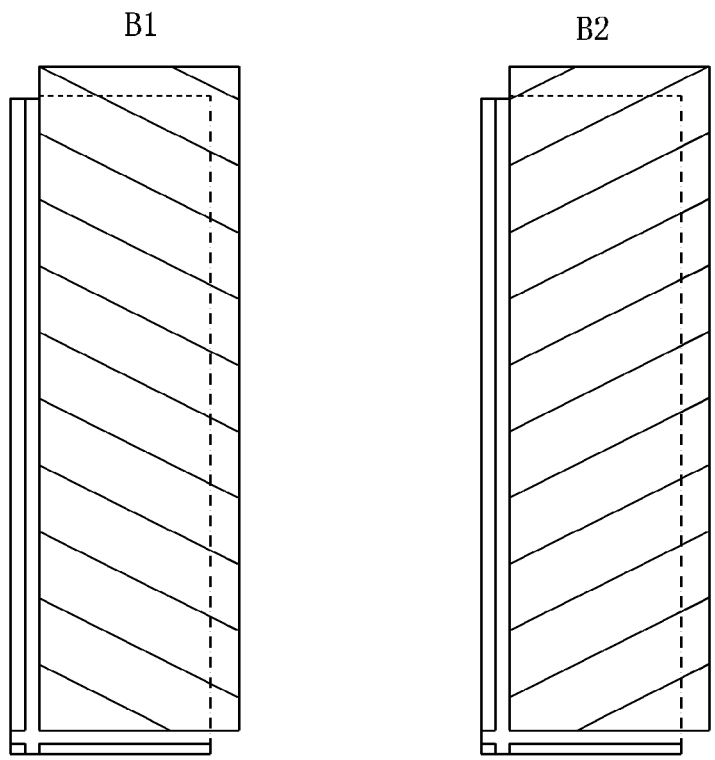
FIG. 6 is a schematic, top view showing locking structures of the surface decorative sections of the surface decorative material of the present invention.
Figure 7A:
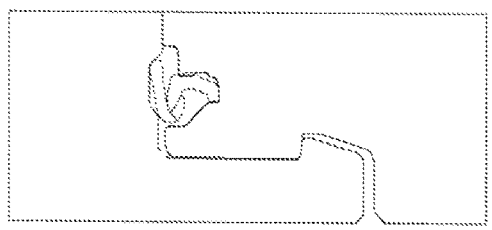
FIGS. 7a to 7d are cross-sectional views showing the locking structures of the surface decorative sections of the surface decorative material of the present invention.
Figure 7B:
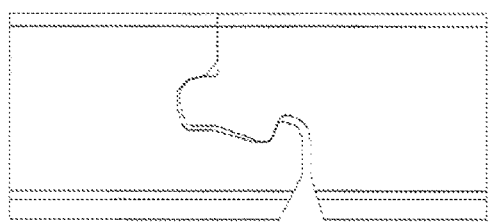
Figure 7C:
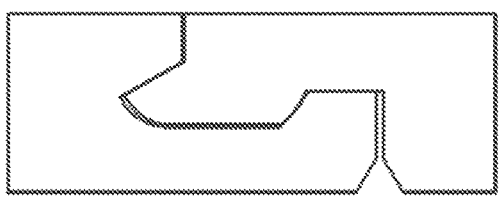
Figure 7D:
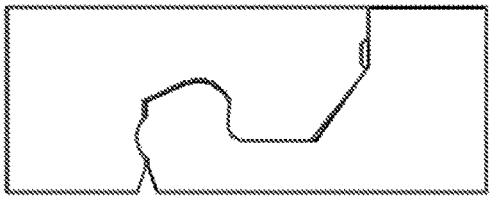

Referring to FIG. 5, due to the rectangular shaped surface decorative section of the present invention has oblique pattern stripes formed thereon, the surface decorative sections of the present invention could be paved by long-to-long edge and short-to-short edge to form a surface decorative material with smooth herringbone patterns. There is no need to pave the surface decorative sections by long-to-short edge as well as long-to-long edge and short-to-short edge. Therefore, when installing the surface decorative sections of the present invention, it is only need to snap the lateral tongue arranged on the type-B1 or the type-B2 decorative section of FIG. 6 into the lateral groove arranged on the type-B1 or the type-B2 decorative section of FIG. 6, and snap the longitudinal tongue arranged on the type-B1 or the type-B2 decorative section into the longitudinal groove arranged on the type-B2 or the type-B1 decorative section. However, in the floor boards of CN100375823C, particular see FIGS. 4a, 4b and 9b, the lateral tongues and the longitudinal grooves of the type A board are needed to be clasped with the longitudinal grooves and the lateral tongues of the type B board as well as the lateral tongues of the type A board and the type B board are clasped with the lateral grooves of the type A board and the type B board, and the longitudinal tongues of the type A board and the type B board are clasped with the longitudinal grooves of the type A board and the type B board. Therefore, as shown in FIG. 6 of the present invention, the type-B1 decorative section and the type-B2 decorative section could have the same mechanical locking structures, while the locking structures of the type A board and the type B board in CN100375823C are mirror inverted relative to each other. The locking structures of the type-B1 decorative section and the type-B2 decorative section of the present invention may have many options, FIGS. 7a to 7d show several kinds of locking structures on the type-B1 decorative section and the type-B2 decorative section. When designing the locking structures of the surface decorative sections, the longitudinal locking structures may be common tongue-and-groove structures, and the lateral locking structures may be the tongue-and-groove structures which could be easily clasped and keep firm clasping connection, because the surface decorative sections could be easily clasped along longitudinal direction while the interlocking along the lateral direction are more difficult and need to keep firm clasping connection.

Figure 8:
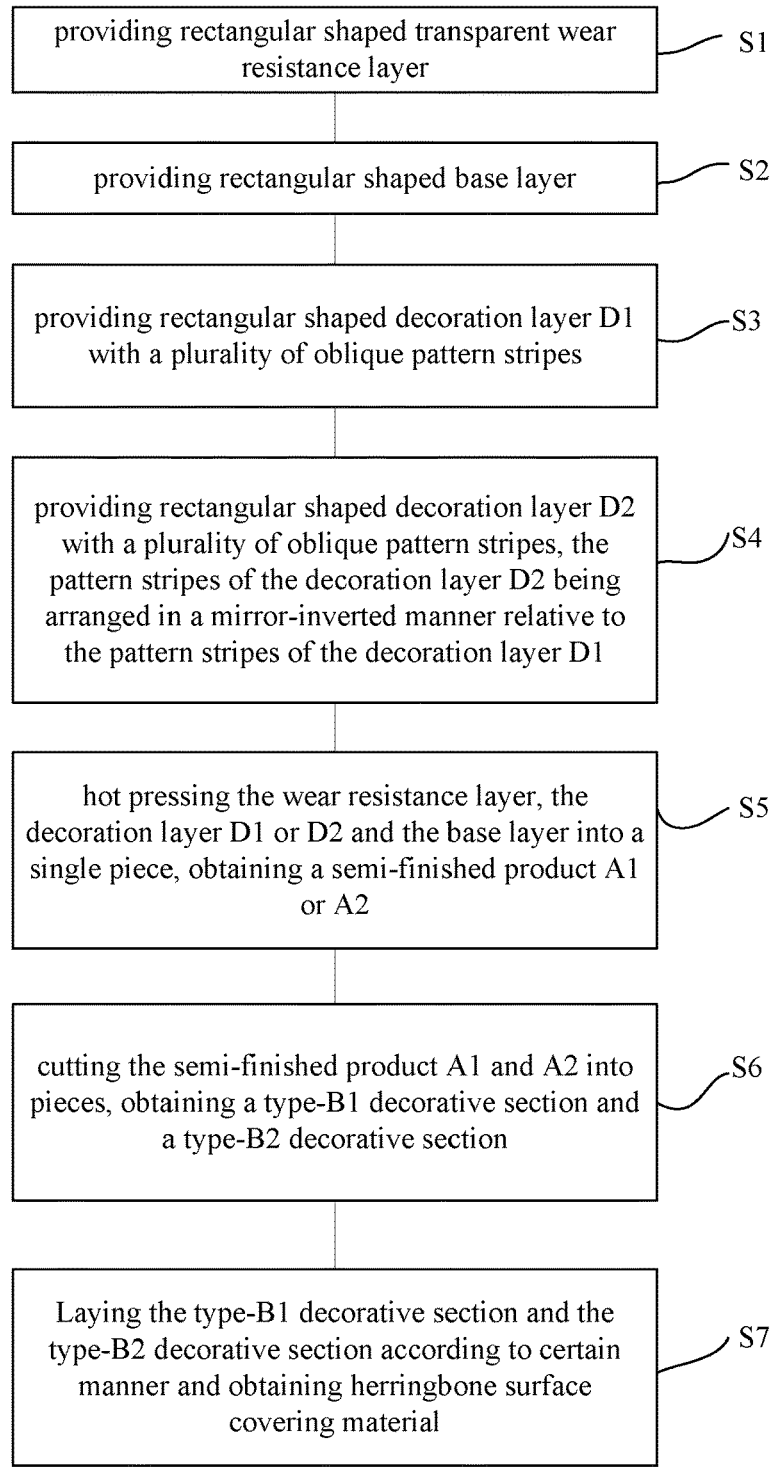
FIG. 8 is a flow chart showing a manufacturing method of the surface decorative material of the present invention.

FIG. 8 shows a flow chart of the manufacturing method of the surface decorative material of the present invention. Referring to FIG. 8, the manufacturing method includes the following steps:

Step S1: providing rectangular shaped transparent wear resistance layer.

Step S2: providing rectangular shaped base layer.

Step S3: providing rectangular shaped decoration layer D1 with oblique pattern stripes printed on its surface, the decoration layer D1 has a pair of first edges and a pair of second edges connected between the first edges. In this embodiment, the first edge extends along the longitudinal direction of the decoration layer D1, and the second edge extends along the lateral direction of the decoration layer D1. The inclination angle and the width of the pattern stripes of the decoration layer D1 are determined by the inclination angle and the width of the pattern stripes of the surface decorative section to be manufactured. In this embodiment, the decoration layer D1 is used for manufacturing the type-B1 decorative section. The width of the pattern stripes of the decoration layer D1 substantially equals to the width d of the pattern stripes of the type-B1 decorative section. A longitudinal extension direction of the pattern stripes of the decoration layer D1 forms an acute angle α with the second edge of the decoration layer D1. The acute angle α is the inclination angle of the pattern stripes of the decoration layer D1, and the acute angle α is also the angle formed between the longitudinal extension direction of the pattern stripe of the type-B1 decorative section and the first edge 11 of the type-B1 decorative section. Furthermore, referring to FIG. 9, in order to save raw material and reduce cutting numbers of semi-finished products, the length of the decoration layer D1 is preferably integer multiple times of the width of the surface decorative section to be manufactured, the width of the decoration layer D1 is greater than the length of the surface decorative section to be manufactured, and a distance m3 from an intersection point of the corner-most stripe pattern T0 and the first edge of the decoration layer D1 to a second edge adjacent to the corner-most stripe pattern T0 substantially equals to a distance from an intersection point of a corresponding stripe pattern of a surface decorative section to be manufactured and an adjacent second edge 12 of the surface decorative section to an adjacent first edge 11 of the surface decorative section. In this embodiment, the distance m3 on the decoration layer D1 substantially equals to the distance m1 (shown in FIG. 2) on the type-B1 decorative section.

Step S4: providing rectangular shaped decoration layer D2 with oblique pattern stripes printed on its surface, the boundary lines between adjacent pattern stripes of the decoration layer D2 are arranged in a mirror-inverted manner relative to the boundary lines between adjacent pattern stripes of the decoration layer D1. The decoration layer D2 is used for manufacturing the type-B2 decorative section.

Figure 9:
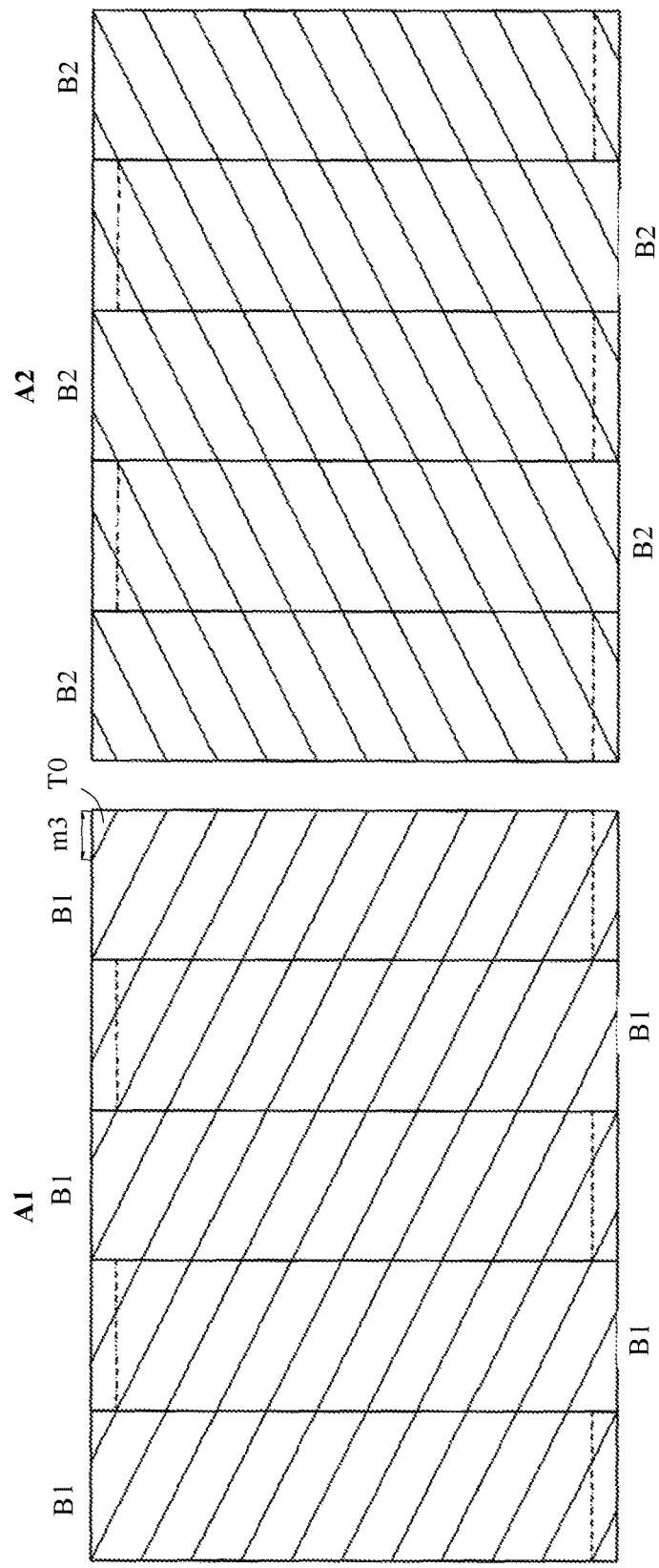
FIG. 9 is a schematic view showing semi-finished products of the surface decorative sections of the surface decorative material of the present invention, the dotted line represents cutting lines of the semi-finished products.

Step S5: hot pressing. The base layer, the decoration layer D1 or D2 and the wear resistance layer are put in that order and are hot pressed into a single piece. During this process, an embossed plate with stripe patterns, whose longitudinal extension direction is identical with the longitudinal extension direction of the pattern stripes of the decoration layer, may be used to form the embossing stripes on the surface of the wear resistance layer to obtain semi-finished products A1 or A2 as shown in FIG. 9.

Step S6: cutting the semi-finished products A1 and A2 into pieces and obtaining the type-B1 decorative sections and the type-B2 decorative sections.

Step S7: laying the type-B1 decorative sections and the type-B2 decorative sections, obtaining the herringbone surface decorative material as shown in FIG. 5.

It should be noted that, a Step S8 of determining cutting lines on the decoration layer D1 and D2 may be introduced before the Step S6 of cutting the semi-finished products A1 and A2.

According to the theory, as long as the inclination angle and the width of the pattern stripes of the decoration layer D1 or D2 substantially equal to the inclination angle and the width of the pattern stripes of the type-B1 decorative section or the type-B2 decorative section, the cutting lines could be measured on the decoration layer D1 or D2, and the type-B1 decorative sections or the type-B2 decorative sections could be accordingly obtained by cutting the semi-finished products A1 and A2. Preferably, in order to save raw material and reduce cutting numbers, the decoration layer D1 or D2 preferably meets the requirements described in FIG. 9 and Step S3. When the decoration layer D1 or D2 meets the requirements described in FIG. 9 and Step S3, the Step S8 of determining the cutting lines on the decoration layer D1 and D2 includes the following Steps.

Step S81: determining longitudinal cutting lines along width direction of the decoration layer D1 and D2, according to the width of the type-B1 decorative section and the type-B2 decorative section to be manufactured. More concretely, the Step S81 includes: measuring a width equals to the width of the type-B1 decorative section and the type-B2 decorative section to be manufactured along the length direction of the decoration layer D1 and D2, and drawing longitudinal cutting lines through marked measuring points along the width direction of the decoration layer D1 and D2.

Step S82: determining lateral cutting lines along length direction of the decoration layer D1 and D2 according to distances from intersection points of the corner-most stripe pattern and adjoining second edge 12 to adjacent first edge 11 of the type-B1 decorative section and the type-B2 decorative section to be manufactured. More concretely, the Step S82 includes: drawing first lines parallel to the width direction of the decoration layer D1 and D2 and through the intersection points of the corner-most stripe pattern T0 and the first edge of the decoration layer D1 and D2, then drawing second lines parallel to the length direction of the decoration layer D1 and D2 and through the intersection points of the first lines and the boundary lines of the stripe patterns located at an opposite end (i.e., the bottom end shown in FIG. 9) of the decoration layer D1 and D2. The second lines are the lateral cutting lines of the outermost surface decorative section which includes the corner-most stripe pattern T0 of the decoration layer D1 and D2, and the surface decorative sections which spaces intervals from the outermost surface decorative section and includes the same stripe pattern as the corner-most stripe pattern T0 of the decoration layer D1 and D2. These surface decorative sections are called as outmost surface decorative section group. Referring to FIG. 9, the outmost surface decorative section group includes three surface decorative sections. In the surface decorative section next to the outermost surface decorative section and its group, the steps of Step S82 are repeated and started from opposite side (i.e., the bottom side shown in FIG. 9) of corner-most stripe pattern T0 and the lateral cutting lines could be drawn on the surface decorative sections next to the outermost surface decorative section and its group. These surface decorative sections are called as the rest surface decorative section group. Referring to FIG. 9, the rest surface decorative section group includes two surface decorative sections.

After drawing the longitudinal and lateral cutting lines on the decoration layer D1 and D2, the semi-finished products A1 and A2 are cut along the cutting lines.

It should be noted that, due to the boundary lines between adjacent pattern stripes of the decoration layer D2 are arranged in a mirror-inverted manner relative to the boundary lines between adjacent pattern stripes of the decoration layer D1, the cutting lines on the decoration layer D2 could be obtained by mirroring the cutting lines on the decoration layer D1, and therefore, there is no need to repeated the steps of Step S8 to determine the cutting lines on the decoration layer D2. The cutting lines on the decoration layer D1 and D2 may be determined before the Step S4 of providing the decoration layer D1 and D2 and be determined at the time drawing decorative patterns on the decoration layer D1 and D2, so that the cutting lines may be printed on the decoration layer D1 and D2 simultaneously with the decorative patterns. Alternatively, the cutting lines on the decoration layer D1 and D2 may be determined after the Step S4 of providing the decoration layer D1 and D2. In that embodiment, the cutting lines are drawn on the decoration layer D1 and D2 by hand.

In the manufacturing method of the surface decorative section, if the provided base layer, decoration layer and wear resistance layer are configured to or substantially configured to square shape, and the stripe patterns form an angle of 45 degree with the first edge of the decoration layer, the decoration layer D1 are substantially the same as the decoration layer D2. Therefore, in the step of providing decoration layer, it is only need to provide one type of decoration layer, for example, the decoration layer D1. Then, the decoration layer D1 are hot pressed to obtain the semi-finished product A1 and the semi-finished product A1 are cut into pieces, and the type-B1 decorative section and the type-B2 decorative section are obtained accordingly. The obtained type-B1 decorative section and type-B2 decorative section are paved adjacent to each other and obtains a herringbone surface decorative material.

As compared to common herringbone surface decorative material, the surface decorative sections of the present invention could be assembled by glue or by locking structures. When the surface decorative sections are assembled by locking structures, the type-B1 decorative section and the type-B2 decorative section only need one type of tongue-and-groove structures, which simplifies the manufacturing of locking structures of the type-B1 decorative section and the type-B2 decorative section. Furthermore, the surface decorative sections of the present invention can be installed rapidly and more efficiency, and is more easily for the apexes of the herringbone patterns to be lain in a straight line, and adequate expansion joints could be reserved and the dimensional stability requirement of the surface decorative sections is according decreased.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A herringbone surface decorative material, comprising:
   a first single board with a type-B1 decorative section printed thereon; and
   a second single board with a type-B2 decorative section printed thereon, each of the type-B1 and the type-B2 decorative sections comprises a plurality of pattern stripes, the pattern stripes being oblique pattern stripes and being parallel to each other, wherein boundary lines are formed between adjacent pattern stripes, and a distance formed between any pair of two neighboring boundary lines equals to another distance formed between another pair of two neighboring boundary lines;
   wherein the type-B1 decorative section comprises a pair of first edges extending along longitudinal direction of the type-B1 decorative section and a pair of second edges extending along lateral direction of the type-B1 decorative section, intersection points of the pattern stripes located at opposite corners of the type-B1 decorative section and their adjacent second edges of the type-B1 decorative section keep the same distances from one of the first edges of the type-B1 decorative section, and the type-B1 decorative section and the type-B2 decorative section are mirrored each other.

2. The herringbone surface decorative material according to claim 1, wherein the type-B1 decorative section and the type-B2 decorative section each is in rectangular shape, a longitudinal extension direction of the pattern stripes of the type-B1 or the type-B2 decorative section form an acute angle with one edge of the type-B1 or the type-B2 decorative section.

3. The herringbone surface decorative material according to claim 2, wherein each of the pattern stripes comprises a number of wood grain bars arranged along the longitudinal extension direction of the pattern stripe, with neighboring wood grain bars having a brim perpendicular to the longitudinal extension direction of the pattern stripe.

4. The herringbone surface decorative material according to claim 3, wherein each of the pattern stripes comprises parallel rows of wood grain bars, each of the bars has a brim perpendicular to the longitudinal extension direction of the pattern stripe, the brims of the bars of adjacent rows are mutually offset in the longitudinal extension direction of the pattern stripe.

5. The herringbone surface decorative material according to claim 2, wherein the acute angle is ranged from 30 degrees to 60 degrees.

6. The herringbone surface decorative material according to claim 1, wherein the type-B1 decorative section and the type-B2 decorative section each has two or more pattern stripes at its corners, except for the pattern stripes at the opposite corners of the type-B1 or the type-B2 decorative section, the rest pattern stripes of the type-B1 or the type-B2 decorative section are all configured to parallelogram shape with an acute angle.

7. The herringbone surface decorative material according to claim 1, wherein the type-B1 decorative section and the type-B2 decorative section each comprises a wear resistance layer, a decoration layer under the wear resistance layer and a base layer under the decoration layer, the pattern stripes are formed on the decoration layer.

8. The herringbone surface decorative material according to claim 7, wherein the wear resistance layer has a plurality of embossing stripes formed thereon, longitudinal extension directions of the embossing stripes are the same as the longitudinal extensions of the pattern stripes on the decoration layer, the plurality of embossing stripes has two or more depths.

9. The herringbone surface decorative material according to claim 1, wherein the type-B1 decorative section comprises a first corner pattern strip, and a second corner pattern strip, the first corner pattern strip locates at a first corner of the type-B1 decorative section, the second corner pattern strip locates at a second corner opposite to the first corner of the type-B1 decorative section, a first boundary line of the first corner pattern strip has a first intersection point with an adjacent second edge, a second boundary line of the second corner pattern strip has a second intersection point with an adjacent second edge, the first intersection point spaces a first distance from one of the first edges, the second intersection point spaces a second distance from the same one of the first edges, the first distance equals to the second distance.

10. The herringbone surface decorative material according to claim 9, wherein the first corner pattern strip is a smallest pattern strip at the first corner of the type-B1 decorative section, the second corner pattern strip is a smallest pattern strip at the second corner of the type-B1 decorative section.

11. A herringbone surface decorative material, comprising:
- a first board comprising a first wear resistance sheet, a first decoration sheet under the first wear resistance sheet, and a first base sheet under the first decoration sheet, the first decoration sheet having a type-B1 decorative section formed thereon; and
- a second board comprising a second wear resistance sheet, a second decoration sheet under the second wear resistance sheet, and a second base sheet under the second decoration sheet, wherein the second decoration sheet having a type-B2 decorative section formed thereon;
- wherein the type-B1 decorative section comprises a pair of first edges, and a pair of second edges, the first edges extend along a longitudinal direction of the type-B1 decorative section, the second edges extend along a lateral direction of the type-B1 decorative section, the type-B1 decorative section is enclosed by the first and the second edges, a plurality of parallel boundary lines, which form an acute angle with the first edges of the type-B1 decorative section, intersects with the first edges of the type-B1 decorative section, a plurality of pattern strips is enclosed by the first edges and the boundary lines, or by the first edges, the second edges and the boundary lines, every two neighboring pattern strips cooperatively use one boundary line, the type-B1 decorative section and the type-B2 decorative section are mirrored each other.

12. The herringbone surface decorative material according to claim 11, wherein the first board and the second board are integrated into a single piece.

13. The herringbone surface decorative material according to claim 11, wherein the first board comprises a first longitudinal tongue, a first longitudinal groove, a first lateral tongue and a first lateral groove, the first longitudinal tongue and the first longitudinal groove are formed on sidewalls of the first edges of the first board respectively, the first lateral tongue and the first lateral groove are formed on sidewalls of the second edges of the first board respectively, the second board comprises a second longitudinal tongue, a second longitudinal groove, a second lateral tongue, and a second lateral groove, the second longitudinal tongue and the second longitudinal groove are formed on sidewalls of first edges of the second board respectively, the second lateral tongue and the second lateral groove are formed on sidewalls of second edges of the second board respectively.

* * * * *